Patented Nov. 1, 1938

2,135,444

UNITED STATES PATENT OFFICE 2,135,444

PROCESS FOR PREPARING NITROHYDROXY COMPOUNDS OF THE PARAFFIN SERIES

Byron M. Vanderbilt, Terre Haute, Ind., assignor to Purdue Research Foundation, Lafayette, Ind., a corporation of Indiana No Drawing. Application June 7, 1937;
Serial No. 146,855

8 Claims. (Cl. 260—632)

My invention relates to the production of nitrohydroxy compounds by the reaction of nitrohydrocarbons and aldehydes. More specifically, my invention relates to an improved process for the production of nitroalcohols and nitroglycols by the reaction of nitroparaffins and aliphatic aldehydes.

It has previously been known that nitroparaffins and aliphatic aldehydes could be reacted in the presence of an alkaline catalyst to produce nitroalcohols or nitroglycols. According to this process one molecule of aldehyde may be added to the nitroparaffin at each hydrogen atom attached to the carbon atom to which the nitro group is attached. Thus, it is possible to produce a trihydroxy compound from nitromethane, a dihydroxy compound from a primary nitroparaffin other than nitromethane, and only a monohydroxy compound from a secondary nitroparaffin. In the past these reactions have been carried out by mixing the nitroparaffin, aldehyde, and an aqueous solution of the alkaline catalyst, and allowing the exothermic reaction to raise the temperature or heating the mixture to secure an increased temperature. This procedure has given rise to the formation of the desired products, but only in yields which were disadvantageously low from a commercial standpoint. Representative yields which have been reported by prior investigators range from 30 to 70%, and up to the present time no explanation has been given as to these low yields.

I have now discovered that the low yields previously obtained were to a large degree attributable to the condensation of aldehyde to form aldol products, or resinification of the aldehyde, and that these undesirable reactions may be minimized by employing the improved process hereinbelow described. According to the process of my present invention, it is possible to secure consistently yields of the order of 80 to 100%, usually 90 to 95% of the theoretical.

My improved process comprises essentially carrying out the reaction in the presence of an auxiliary solvent which will maintain a single phase system, and adding the aldehyde slowly to a solution of the nitroparaffin and catalyst in the auxiliary solvent while thoroughly agitating.

In accordance with this procedure only a small amount of aldehyde is present in the mixture at any given time, and the excess of nitroparaffin gives rise to a preferential reaction of aldehyde with nitroparaffin rather than a condensation of aldehyde with itself. By employing the auxiliary solvent and agitating during the addition of the aldehyde, any possibility of a localized high concentration of aldehyde is avoided, thus further decreasing the possibility of aldehyde condensation reactions. In a two phase system both the aldehyde and the alkaline catalyst are more soluble in the aqueous phase than in the nitroparaffin, with the result that there is a local admixture of these materials even with agitation, and the alkaline material thus tends to preferentially catalyze the aldehyde condensation reactions. This possibility is obviated by the present procedure.

I have further found that the formation of the nitrohydroxy compounds in preference to the aldehyde condensation products is favored by low temperatures, and that improved yields can therefore be obtained by avoiding heating and by providing external cooling in the case of highly exothermic reactions. The maximum temperature for optimum yields will vary to some extent depending upon the particular aldehyde utilized. For example, formaldehyde does not tend to condense with itself to the same degree that the higher aldehydes do, and a higher temperature is therefore permissible when utilizing this material. I have found that 50° C. is a safe maximum temperature for formaldehyde reactions; that 40° C. is a safe maximum for acetaldehyde or butyraldehyde; and that a slightly higher temperature should be maintained in the cases of the higher aldehydes. In general, I prefer to maintain the reaction temperature between 30 and 35° C.

In carrying out the reactions dealt with in the present invention, the proportions of reactants will, of course, depend upon the type of nitrohydrocarbon employed and the desired product. If it is desired to produce a nitroalcohol, theoretically 1 mole of aldehyde should be employed per mole of nitroparaffin, and this will be found to be satisfactory in the case of secondary nitroparaffins since a nitroalcohol is then the only possible product. However, when employing primary nitroparaffins, nitroalcohols and nitroglycols will be produced in an equilibrium mixture, and in this case it is therefore desirable to utilize an excess of nitroparaffin if the nitroalcohol is the desired product. Conversely, if a nitroglycol is desired, two moles of formaldehyde per mole of nitroparaffin should be employed and a slight excess of formaldehyde may suitably be used. It has not been found possible to condense more than one mole of an aldehyde, other than formaldehyde, with a nitroparaffin other than nitromethane.

The auxiliary solvents utilized in my process may be any solvents which will maintain a single phase system and which will be chemically inactive in the process. I have found that methyl alcohol and ethyl alcohol, for example, are suitable for my process, both from an operating standpoint and from an economical point of view. The solvents should preferably be employed only in a concentration sufficient to maintain the single phase system. If a large amount in excess of this is utilized it will be necessary to employ a larger amount of the alkaline material to maintain a suitable catalyst concentration, and the recovery of the product will be made more difficult by the increased volume of solvent to be removed.

Any suitable alkaline catalyst may be employed in my process as, for example, sodium hydroxide, potassium hydroxide, potassium carbonate, or any of the alkaline catalysts previously employed for this type of condensation reaction. It is obviously desirable, however, that the catalyst be soluble in a minimum amount of reaction mixture and for this reason I prefer to employ the alkali metal hydroxides in combination with aqueous alcohol as the solvent. It will be apparent, however, that other materials, such as sodium ethylate, or the like, will also meet this requirement and can suitably be employed in my process. The concentration of the catalyst to be employed will depend to some extent upon the particular reaction, since the various types of nitroparaffins do not react with equal ease. Thus, a higher concentration of catalyst is required for the reaction of a secondary nitroparaffin than is necessary in the case of a primary nitroparaffin. However, I have found that in general a concentration of from 0.1% to 1.0% of catalyst based on the total weight of the reaction mixture will be satisfactory. The amount to be used in any given case should be maintained at the minimum for satisfactory production of the nitrohydroxy compound, since any excess will tend to increase aldehyde condensation reaction. In any given case simple preliminary experiments will readily determine the optimum amount to be employed. At the conclusion of the reaction it is essential that the alkaline catalyst be completely neutralized to a neutral salt in order to obtain high yields, otherwise the nitroalcohols will be decomposed during subsequent steps such as distillation. Thus, neutralization of the alkali metal catalysts with weak acids such as carbon dioxide or acetic acid ordinarily does not give satisfactory results because of the alkaline nature of such carbonates or acetates.

In carrying out the reaction the required amounts of nitroparaffin, solvent, and catalyst are placed in a suitable vessel equipped with cooling means, and the aldehyde is then slowly introduced with thorough agitation. In the case of formaldehyde an aqueous solution may be utilized, or the material may be introduced in the gaseous form, or even in the solid state as paraformaldehyde, if introduced gradually and thoroughly dispersed. The higher aldehydes may simply be introduced in their liquid state. However, if the temperature is maintained substantially below 30° C., vigorous reaction may not be attained during addition of the aldehyde in which case it will be necessary to raise the temperature to 30-35° C., and maintain it at this point until the primary reaction is complete. In most cases the course of the primary reaction may be followed by the tendency of the temperature to rise due to the exothermic nature of the reaction. External cooling should be utilized to maintain the optimum temperature of 30-35° C. during this period. In this initial stage of the reaction the conversion to the nitrohydroxy compound is not quite completed, and for optimum conversion it is necessary to allow the mixture to stand at reaction temperature for a number of hours and, preferably, from 1 to 3 days. However, in a semi-continuous process the degree of conversion obtained in the initial stage may be found to be sufficient, if means are utilized to remove unreacted aldehyde without encountering losses by condensation, or by using an excess of the nitroparaffin and recovering the same. At the conclusion of the reaction the nitrohydroxy compound can be recovered and purified according to any of the known means.

The following specific examples illustrate the application of my invention to the production of various nitrohydroxy compounds:

Example I

A mixture of 165 parts by weight of nitroethane, 120 parts of 95% ethyl alcohol, and 6.6 parts of 10 N sodium hydroxide was placed in a vessel equipped with external cooling means. 85 parts of acetaldehyde were slowly added while agitating the mixture. The reaction proceeded vigorously at 30° C. and slight external cooling was necessary to maintain this temperature. The initial stage of the reaction was completed within one hour, and at the end of that time the vessel was allowed to stand without further agitation for a period of three days. The sodium hydroxide was then carefully neutralized with hydrochloric acid and the mother liquor distilled under slightly reduced pressure. The 2-nitro-3-butanol was then distilled under a vacuum of 10-30 m. m. The yield was 207 parts by weight, or 87% of the theoretical.

Example II

The procedure of Example I was followed, utilizing the following initial mixture: 133.5 parts by weight of 1-nitropropane, 120 parts of 95% ethyl alcohol, 6.6 parts of 10-N sodium hydroxide. Into this mixture 72.6 parts of acetaldehyde were slowly introduced. A yield of 184 parts of 3-nitro-2-pentanol was obtained, constituting 92% of the theoretical yield.

Example III

The procedure of Example I was followed, utilizing the following initial mixture: 206 parts by weight of 1-nitrobutane, 80 parts of 95% ethyl alcohol, 11.1 parts of 10-N potassium hydroxide. Into this mixture 144 parts of butyraldehyde were slowly introduced. A yield of 310 parts of 5-nitro-4-octanol was obtained, constituting 88.5% of the theoretical yield.

Example IV

The procedure of Example I was followed, utilizing the following initial mixture: 51.5 parts by weight of 2-nitrobutane, 9 parts of aqueous methyl alcohol, 10.4 parts of 1 N sodium hydroxide. Into this mixture 44.5 parts of formalin (39% formaldehyde) were slowly introduced. A yield of 62.5 parts of 2-methyl-2-nitrobutanol was obtained, constituting 94% of the theoretical yield.

Example V

The procedure of Example I was followed, utilizing the following initial mixture: 35.6 parts by weight of 1-nitropropane, 1.33 parts of 10-N sodium hydroxide, 16 parts of ethyl alcohol. Into this mixture 65.3 parts of formalin (37.5% formaldehyde) were slowly introduced. In this case the product constituted a nitroglycol which is non-volatile, and was therefore purified by crystallization rather than distillation. A yield of 59.4 parts of 2-ethyl-2-nitro-1,3-propanediol was obtained, constituting 99% of the theoretical yield.

It is to be understood, of course, that my invention is not to be construed as limited to the particular examples given above. My improved procedure is applicable generally to the production of nitrohydroxy compounds from nitroparaffins and aldehydes, and may therefore be utilized in connection with any such materials if the solubility requirements of this process are satisfied. Likewise, as has previously been pointed out, numerous catalysts and solvents other than those set forth in the examples may be utilized, and the procedure may be modified in numerous respects without departing from the scope of my invention. In general, it may be said that any equivalents or modifications of procedure which would naturally occur to one skilled in the art are included in the scope of my invention.

My invention now having been described, what I claim is:

1. In a process for the production of nitrohydroxy compounds by the reaction of nitroparaffins and aldehydes in the presence of an alkaline catalyst, the improvement which comprises slowly introducing the aldehyde into a solution of nitroparaffin and catalyst in an organic liquid which is a common solvent for the nitroparaffin, the catalyst, and the aldehyde, while agitating said mixture.

2. In a process for the production of nitrohydroxy compounds by the reaction of nitroparaffins and aldehydes in the presence of an alkaline catalyst, the improvement which comprises slowly introducing the aldehyde into a solution of nitroparaffin and catalyst in an organic liquid which is a common solvent for the nitroparaffin, the catalyst, and the aldehyde, while agitating said mixture, and completely neutralizing the alkaline catalyst at the conclusion of the reaction.

3. In a process for the production of nitrohydroxy compounds by the reaction of nitroparaffins and aldehydes in the presence of an alkaline catalyst, the improvement which comprises slowly introducing the aldehyde into a solution of nitroparaffin and catalyst in an organic liquid which is a common solvent for the nitroparaffin, the catalyst, and the aldehyde, while agitating said mixture, and maintaining the temperature at a point sufficiently low to prevent substantial condensation of the aldehyde employed.

4. In a process for the production of nitrohydroxy compounds by the reaction of nitroparaffins and formaldehyde in the presence of an alkaline catalyst, the improvement which comprises slowly introducing the formaldehyde into a solution of nitroparaffin and catalyst in an organic liquid which is a common solvent for the nitroparaffin, the catalyst, and the formaldehyde, while agitating said mixture and maintaining the temperature below 50° C.

5. In a process for the production of nitrohydroxy compounds by the reaction of nitroparaffins and aldehydes containing more than one carbon atom in the presence of an alkaline catalyst, the improvement which comprises slowly introducing the aldehyde into a solution of nitroparaffin and catalyst in an organic liquid which is a common solvent for the nitroparaffin, the catalyst, and the aldehyde, while agitating said mixture and maintaining the temperature below 40° C.

6. In a process for the production of nitrohydroxy compounds by the reaction of nitroparaffins and aldehydes in the presence of an alkaline catalyst, the improvement which comprises slowly introducing the aldehyde into a solution of the nitroparaffin in aqueous lower monohydric aliphatic alcohol containing an alkali metal hydroxide while agitating said mixture, and maintaining the temperature at a point sufficiently low to prevent substantial condensation of the aldehyde employed.

7. In a process for the production of nitrohydroxy compounds by the reaction of nitroparaffins and formaldehyde in the presence of an alkaline catalyst, the improvement which comprises slowly introducing the formaldehyde into a solution of the nitroparaffin in aqueous lower monohydric aliphatic alcohol containing an alkali metal hydroxide while agitating said mixture, and maintaining the temperature below 50° C.

8. In a process for the production of nitrohydroxy compounds by the reaction of nitroparaffins and aldehydes containing more than one carbon atom in the presence of an alkaline catalyst, the improvement which comprises slowly introducing the aldehyde into a solution of the nitroparaffin in aqueous lower monohydric aliphatic alcohol containing an alkali metal hydroxide while agitating said mixture, and maintaining the temperature below 40° C.

BYRON M. VANDERBILT.